United States Patent [19]

Minalga

[11] 4,185,571
[45] Jan. 29, 1980

[54] ANALOG ADJUSTMENT ARRANGEMENT IN A DIGITALLY CONTROLLED POSITIONING SYSTEM

[75] Inventor: Philip F. Minalga, Piscataway, N.J.

[73] Assignee: The Singer Company, New York, N.Y.

[21] Appl. No.: 928,941

[22] Filed: Jul. 28, 1978

[51] Int. Cl.² .......................... D05B 3/06; D05B 3/02
[52] U.S. Cl. .............................. 112/158 B; 112/158 E
[58] Field of Search .......... 112/158 E, 158 B, 121.11, 112/210; 318/567

[56] References Cited

U.S. PATENT DOCUMENTS

| 3,654,882 | 4/1972 | Kamena | 112/121.11 |
| 3,687,097 | 8/1972 | Kosrow et al. | 112/210 |
| 3,984,745 | 10/1976 | Minalga | 112/158 E |
| 4,016,821 | 4/1977 | Minalga | 112/158 E |
| 4,048,932 | 9/1977 | Odermann et al. | 112/158 E |

Primary Examiner—Peter P. Nerbun
Attorney, Agent, or Firm—David L. Davis; Robert E. Smith; Edward E. Bell

[57] ABSTRACT

A system is disclosed for positioning an instrumentality over a predetermined range in response to a digitally coded position signal. To effect desired adjustments between digitally achieved positions, algebraically adjustable signals are subtracted from an analog position signal obtained from the digitally coded position signal.

5 Claims, 1 Drawing Figure

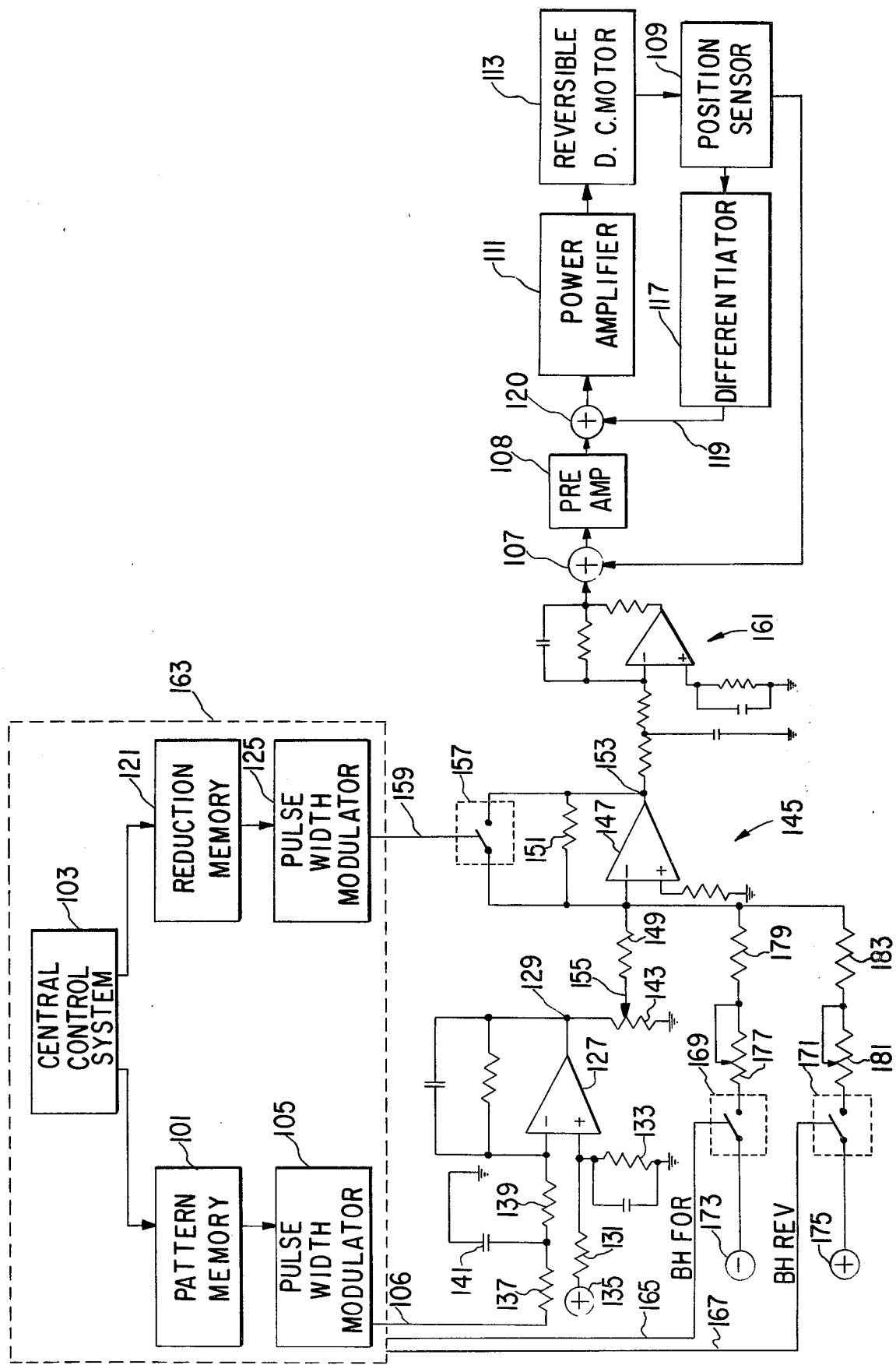

ANALOG ADJUSTMENT ARRANGEMENT IN A DIGITALLY CONTROLLED POSITIONING SYSTEM

DESCRIPTION

Background of the Invention

This invention relates to sewing machines and, more particularly, to sewing machines having positional coordinates for successive stitch penetrations stored as digital codes in a memory. Specifically, this invention relates to the adjustment of such positional coordinates between the limited number of discrete values attainable by the digital codes.

A sewing machine is disclosed in copending U.S. patent application Ser. No. 928,938, filed on even date herewith by William H. Dunn and John W. Wurst, and assigned to the assignee of the present invention, wherein the positional coordinates for successive stitch penetrations for a buttonhole pattern are stored in a memory having addressable locations. The buttonhole pattern includes two spaced-apart rows of zig zag stitches each formed by sewing a row of narrow zig zag cording stitches in a first direction and subsequently covering the cording stitches with a visible row of zig zag stitches formed in a second direction. The stitch length is determined by digital data stored in the memory. This digital data is only capable of providing discrete values of feed. It may be that optimum buttonhole appearance is achieved by a value of feed intermediate the discrete values which are attainable from available digital codes. Further, different feed values for forward and reverse directions of feed may be desired.

It is therefore an object of the present invention to provide an arrangement whereby values of feed intermediate discretely available values may be attained.

It is a further object of this invention to provide such an arrangement whereby different values of feed for forward and reverse directions of feed may be attained.

SUMMARY OF THE INVENTION

The foregoing and additional objects are attained in accordance with the principles of this invention in a sewing machine having a stitch forming instrumentality positionally controlled over a predetermined range between stitches for producing a pattern of stitches, a memory for storing pattern information in digital form, wherein discrete positions of the stitch forming instrumentality are defined by digital code words stored in the memory; means operating in timed relation with the sewing machine for recovering selected digital code words from the memory; converter means for generating a positional analog signal related to the selected digital code word; and servo means responsive to the positional analog signal for positioning the stitch forming instrumentality; by providing a signal source; transmission means coupled at one end to the output of the converter means for varying the positional analog signal by algebraically summing therewith a signal applied to the other end of the transmission means; controllable switch means coupled between the signal source and the transmission means and responsive to a control signal applied thereto for connecting the signal source to the other end of the transmission means; and control means for selectively generating the control signal.

In accordance with an aspect of this invention, the signal source includes a fixed voltage.

In accordance with a further aspect of this invention, the transmission means includes a variable attenuator.

In accordance with another aspect of this invention, the stitch forming instrumentality includes a feed regulating mechanism positionable for two directions of feed; the signal source includes a first voltage source of a first polarity and a second voltage source of a second polarity, the controllable switch means includes a first controlled switch coupled between the first voltage source and the transmission means and a second controlled switch coupled between the second voltage source and the transmission means, and the control means includes means for selectively generating the control signal to close the first switch for the first direction of feed and the second switch for the second direction of feed.

BRIEF DESCRIPTION OF THE DRAWING

The foregoing will be more readily apparent upon reading the following description in conjunction with the single FIGURE of the drawing which illustrates circuitry constructed in accordance with the principles of this invention incorporated in a sewing machine stitch instrumentality regulator actuator mechanism.

DETAILED DESCRIPTION

Referring now to the drawing, shown therein is a portion of a system for controlling the operation of a sewing machine, and in which circuitry constructed in accordance with the principles of this invention is incorporated. For a complete description of such a system, the reader is referred to copending U.S. patent application Ser. No. 928,940, filed on even date herewith by William H. Dunn and John W. Wurst, and assigned to the assignee of the present invention, the disclosure of which application is hereby incorporated by reference. However, for the sake of completeness, a brief description of the system disclosed in the above referenced application will be given herein.

In a sewing machine of the type disclosed in the above referenced application, a pattern memory 101 is utilized for storing digital information related to the positional coordinates for each stitch of a plurality of stitch patterns. Under the control of an operator influenced central control system 103, the appropriate information from a pattern memory 101 is applied to a pulse width modulator 105, the output of which on the lead 106 is supplied to apropriate circuitry, as will be described in more detail hereinafter, which provides an analog signal to a summing junction 107 which is the input to a closed loop servo system for controlling the feed actuator. Similar circuitry is provided for controlling the bight actuator, but as the present invention is only concerned with control of the feed actuator, no explanation of the bight actuator control system will be given herein. The closed loop servo system includes an outer position loop and an inner rate loop. The position loop includes the preamplifier 108, the rate loop, and the position sensor 109. The rate loop includes power amplifier 111 which supplies direct current of reversible polarity to an electromechanical actuator 113, which in the broadest sense comprises a reversible DC motor, to position the actuator 113 in accordance with the input signal to the summing junction 107, derived from the signal on the line 106 from the pulse width modulator 105. The feedback position sensor 109 is mechanically connected to the reversible motor 113 and provides a feedback position signal which is differentiated with respect to time in a differentiator 117 to provide a rate signal. This rate signal is presented on the line 119 to the summing junction 120 of the power amplifier 111 to modify the positional signal at that point. As disclosed in the aforereferenced application, a reduction memory 121 is provided so that when an operator desires to alter, or override, the information stored in the pattern memory 101 to achieve a desired stitch length, an appropriate digital word is applied as an input to a pulse width modulator 125.

The output of the pulse width modulator 105 on the lead 106 is presented as an input to an operational amplifier 127. The signal on the lead 106 is a high frequency digital signal having an ON/OFF duty cycle controlled by the binary number of the input to the pulse width modulator 105 from the pattern memory 101, in a manner well known in the art. For example, if the binary number presented as the input to the pulse width modulator 105 is 01100, equivalent to the decimal number 12, the duty cycle of the signal on the lead 106 will be 13/32. The circuitry stage including the operational amplifier 127 functions as a combined filter and digital to analog converter to provide an analog signal on the lead 129 which is a substantially DC level having a magnitude and polarity depending upon the duty cycle of the signal on the lead 106. The break point between the positive and negative outputs at the point 129 as a function of the duty cycle of the signal on the lead 106 is determined by the ratio of the resistors 131 and 133 which provide, in combination with a reference voltage source 135, a reference voltage at the non-inverting input terminal of the operational amplifier 127. The duty cycle controlled signal on the lead 106 is at a high frequency and is filtered by the resistors 137 and 139 and the capacitor 141 to provide a substantially DC voltage level, whose average magnitude is determined by the duty cycle of the signal on the lead 106, at the inverting input terminal of the operational amplifier 127. Thus, on the lead 129 there is an analog signal which is a function of a digital code word presented to the pulse width modulator 105 from the pattern memory 101.

The analog signal on the lead 129 is coupled through a factory adjustable potentiometer 143 to the input of a preamplifier stage 145. The preamplifier stage 145 includes an operational amplifier 147, an input resistor 149 and a feedback resistor 151. As is well known in the art, the ratio of the output voltage of the preamplifier stage 145 on the lead 153 to the input voltage on the lead 155 is equal to the ratio of the value of the feedback resistor 151 to the value of the input resistor 149. Illustratively, the feedback resistor 151 and the input resistor 149 are chosen to be equal in value so that the nominal gain of the preamplifier stage 145 is one volt per volt. However, an analog switch 157 is provided to shunt the feedback resistor 151. The control terminal of the switch 157 is connected via the lead 159 to the output of the pulse width modulator 125. When the switch 157 is pulsed ON, the feedback resistor 151 is short circuited, causing the gain of the preamplifier stage 145 to be substantially zero volts per volt. Therefore, if the switch 157 is pulsed ON and OFF at a high frequency, illustratively on the order of 6 kilohertz, the effective, or average, value of the feedback resistance as seen by the operational amplifier 147 will be determined by the ON/OFF duty cycle of the switch 157. For example, if the signal on the lead 159 were to have a duty cycle of 25% ON and 75% OFF the average value of the feedback resistance of the operational amplifier 147 would be 75% of the value of the resistor 151 and thus the gain of the preamplifier stage 145 would be 0.75 volts per volt, a reduction from a nominal gain of 1 volt per volt. Thus, a digital code word in the reduction memory 121 may be utilized to reduce the gain of the preamplifier stage 145 and hence override information stored in the pattern memory 101.

It was previously mentioned that the switch 157 is an analog switch. The reason for having the switch 157 as an analog switch is that the input signal to the preamplifier stage 145 on the lead 155 is, as previously described, an analog signal. Furthermore, this signal may have either polarity and in such case, the switch 157 must be capable of handling bipolar analog signals. Illustratively, the switch 157 may be a type CD4016B COS/MOS bilateral switch, manufactured by RCA. Alternatively, a field effect transistor (FET) may be utilized.

The output of the preamplifier stage 145 on the lead 153 is coupled through a filtering stage 161 to the summing junction 107, where it is processed as described above. The purpose of the filtering stage 161 is to substantially eliminate the frequency effect of the controlled rate switching of the switch 157 so that a substantially DC signal is applied to the summing junction 107.

The circuitry within the dashed lines 163 is illustratively constructed in the form of a large scale integrated (LSI) circuit chip. In accordance with the principles of this invention, the LSI 163 provides a signal on the lead 165 when a buttonhole pattern is being sewn and when feeding is in a forward direction (BHFOR). Further in accordance with the principles of this invention, the LSI 163 provides a signal on the lead 167 when a buttonhole pattern is being sewn and feeding is in the reverse direction (BHREV). The leads 165 and 167 are connected to the control inputs of switches 169 and 171, respectively, each of which is illustratively a type CD4016B COS/MOS switch, manufactured by RCA. Alternatively, field effect transistors may be utilized. The switch 169 is connected at one end to a voltage source 173 of a first polarity and the switch 171 is connected at one end to a voltage source 175 of a second polarity. The other end of the switch 169 is connected through a signal attenuator 177, illustratively a factory adjustable potentiometer, and through a transmission resistor 179 to the output of the digital to analog converter stage including the operational amplifier 127. Similarly, the other end of the switch 171 is connected through a signal attenuator 181, illustratively a factory adjustable potentiometer, and through a transmission resistor 183 to the output of the digital to analog converter stage including the operational amplifier 127.

Thus, in accordance with the principles of this invention, when a buttonhole pattern stitch is being sewn with a feed increment in either the forward or reverse direction, a fixed voltage is algebraically subtracted from the analog signal corresponding to the programmed digital feed data. The value of this signal is determined by factory adjustment of the potentiometers 177 and 181.

Accordingly, there has been described an arrangement whereby the stitch lengths for the buttonhole pattern may be factory adjusted without affecting the stitch lengths of any other pattern. Although a preferred embodiment has been disclosed herein, it is understood that this is merely illustrative of the application of the principles of this invention. Numerous other arrangements may be devised by those skilled in the art without departing from the spirit and scope of this invention, as defined by the appended claims.

I claim:

1. A sewing machine having a stitch forming instrumentality positionally controlled over a predetermined range between stitches for producing a pattern of stitches; a memory for storing pattern stitch information in digital form, wherein discrete positions of the stitch forming instrumentality are defined by digital code words stored in the memory; means operating in timed relation with the sewing machine for recovering a selected digital code word from said memory; converter means for generating a positional analog signal related to said selected digital code word; servo means responsive to said positional analog signal for positioning said stitch forming instrumentality; and means interposed between said converter means and said servo means for selectively altering said positional analog signal to proportionally alter the size of the pattern produced by the sewing machine; wherein the improvement comprises:

a signal source;

transmission means coupled at one end to the output of said converter means for varying said positional analog signal by algebraically summing therewith a signal applied to the other end of said transmission means;

controllable switch means coupled between said signal source and said transmission means and responsive to a control signal applied thereto for connecting said signal source to said other end of said transmission means; and control means automatically operative during the sewing of a predetermined pattern for selectively generating said control signal.

2. The sewing machine according to claim 1 wherein said signal source includes a fixed voltage.

3. The sewing machine according to claim 1 wherein said transmission means includes a variable attenuator.

4. The sewing machine according to claim 1 wherein said stitch forming instrumentality includes a feed regulating mechanism positionable for two directions of feed;

said signal source includes a first voltage source of a first polarity and a second voltage source of a second polarity;

said controllable switch means includes a first controlled switch coupled between said first voltage source and said transmission means and a second controlled switch coupled between said second voltage source and said transmission means; and said control means includes means for selectively generating said control signal to close said first switch for said first direction of feed and said second switch for said second direction of feed.

5. The sewing machine according to claims 1 or 4 wherein said control means is operative only during the sewing of a buttonhole pattern.

* * * * *